United States Patent
Zhao et al.

(10) Patent No.: US 12,229,780 B2
(45) Date of Patent: Feb. 18, 2025

(54) EMBEDDING SERVICE FOR UNSTRUCTURED DATA

(71) Applicant: Intuit Inc., Mountain View, CA (US)

(72) Inventors: Runhua Zhao, Milpitas, CA (US); Vinay Patlolla, Daly City, CA (US); Nikolas Terani, Los Angeles, CA (US); Taylor J. Cressy, Los Angles, CA (US); Henry Venturelli, Los Angeles, CA (US)

(73) Assignee: Inuit Inc., Mountain View, CA (US)

( * ) Notice: Subject to any disclaimer, the term of this patent is extended or adjusted under 35 U.S.C. 154(b) by 13 days.

(21) Appl. No.: 17/389,532

(22) Filed: Jul. 30, 2021

(65) Prior Publication Data

US 2023/0035639 A1 Feb. 2, 2023

(51) Int. Cl.
  *G06Q 40/00* (2023.01)
  *G06F 16/338* (2019.01)
  *G06Q 20/40* (2012.01)
  *G06N 20/00* (2019.01)

(52) U.S. Cl.
  CPC ..... *G06Q 20/4016* (2013.01); *G06F 16/3347* (2019.01); *G06F 16/338* (2019.01); *G06F 16/353* (2019.01); *G06N 20/00* (2019.01)

(58) Field of Classification Search
  CPC .............. G06Q 20/4016; G06F 16/353; G06F 16/3347; G06F 16/338
  See application file for complete search history.

(56) References Cited

U.S. PATENT DOCUMENTS

| | | | |
|---|---|---|---|
| 11,016,997 B1* | 5/2021 | Huang | G06F 16/285 |
| 11,442,976 B1* | 9/2022 | LaBute | G06F 16/3347 |
| 11,544,317 B1* | 1/2023 | Pancha | G06F 40/30 |
| 2014/0079297 A1* | 3/2014 | Tadayon | G06V 40/172 |
| | | | 382/118 |

(Continued)

FOREIGN PATENT DOCUMENTS

| | | | | | |
|---|---|---|---|---|---|
| WO | WO-2019137050 A1 * | 7/2019 | | | G06K 9/6223 |
| WO | WO-2021138163 A1 * | 7/2021 | | | G06F 16/258 |

OTHER PUBLICATIONS

Camacho-Collados et al., "From Word to Sense Embeddings: A Survey on Vector Representations of Meaning," Journal of Artificial Intelligence Research, 63 (2018), pp. 743-788. (Year: 2018).*

(Continued)

*Primary Examiner* — Hani M Kazimi
*Assistant Examiner* — William B. Bunker
(74) *Attorney, Agent, or Firm* — Lathrop GPM LLP

(57) ABSTRACT

A method may include generating a vector from unstructured data included in an untransformed transaction, and determining, for the vector, a cluster ID of cluster IDs by matching the vector with a matching cluster vector of cluster vectors. The method may further include generating a query using the cluster ID and the untransformed transaction, and transforming, using the cluster IDs, untransformed transactions to transformed transactions. The transformed transactions may each include a cluster ID. The method may further include generating, using the query, a query result from features of the transformed transactions, generating a fraud score using the query result, and presenting the fraud score and the cluster ID.

12 Claims, 10 Drawing Sheets

(56) References Cited

U.S. PATENT DOCUMENTS

| | | | |
|---|---|---|---|
| 2018/0267977 A1* | 9/2018 | Bandyopadhyay | ............................ G06F 16/90335 |
| 2018/0270261 A1* | 9/2018 | Pande | ...................... G06N 7/01 |
| 2019/0236609 A1* | 8/2019 | Li | ............................. G06N 3/08 |
| 2020/0005333 A1* | 1/2020 | Lutich | .................... G06Q 30/04 |
| 2020/0142989 A1* | 5/2020 | Bordawekar | ............. G06N 5/04 |
| 2020/0327285 A1* | 10/2020 | Cox | .................. G06F 16/90348 |
| 2021/0200768 A1 | 7/2021 | Lesner et al. | |
| 2021/0326888 A1* | 10/2021 | Adjaoute | ............... G06N 5/048 |
| 2021/0390128 A1* | 12/2021 | Dasgupta | ............. G06F 16/353 |
| 2022/0058341 A1* | 2/2022 | Lambert | ............... G06F 40/211 |
| 2022/0277008 A1* | 9/2022 | Bordawekar | ..... G06F 16/24542 |
| 2022/0382784 A1* | 12/2022 | Osuala | ................. G06F 16/285 |
| 2023/0103143 A1* | 3/2023 | Srinivasan | .............. G06F 16/35 705/3 |

OTHER PUBLICATIONS

Qureshi et al., "EVE: explainable vector based embedding technique using Wikipedia," J Intell Info Sys, 2019 (Year: 2019).*

Altuneu et al., "Graph-based Topic Extraction from Vector Embeddings of Text Documents: Application to a Corpus of News Articles," arXiv:2010, 15067v1 [cs.CL] 2020 (Year: 2020).*

Zhang et al., "Towards Understanding Word Embeddings: Automatically Explaining Similarity of Terms," IEEE International Conference on Big Data, 2016 (Year: 2016).*

Examination Report No. 1 for Standard Patent Application for Australian Application 2022204092, mailed Mar. 7, 2023, 3 pages.

* cited by examiner

EMBEDDING SERVICE FOR UNSTRUCTURED DATA

BACKGROUND

Machine learning models that process unstructured data are typically tightly coupled with downstream models (e.g., a fraud detection model) that use the output of the machine learning models. Thus, changes in the machine learning model may require adjustments to the operation and/or training of downstream models. Decoupling the implementation of the machine learning model from the operation and/or training of downstream models represents an unsolved challenge.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method including generating a vector from unstructured data included in an untransformed transaction, and assigning, for the vector, a cluster ID by matching the vector with a matching cluster vector. The method further includes generating a query using the cluster ID and the untransformed transaction, and transforming, using cluster IDs, untransformed transactions to transformed transactions. The transformed transactions each include a cluster ID. The method further includes generating, using the query, a query result from features of the transformed transactions, generating a fraud score using the query result, and presenting the fraud score and the cluster ID.

In general, in one aspect, one or more embodiments relate to a server including embedding models, a cluster model, and an application executing on the server and configured for: generating a vector from unstructured data of an untransformed transaction, and assigning, for the vector, a cluster ID by matching the vector with a matching cluster vector. The application is further configured for generating a query using the cluster ID and the untransformed transaction, and transforming, using cluster IDs, untransformed transactions to transformed transactions. The transformed transactions each include a cluster ID. The application is further configured for generating, using the query, a query result from features of the transformed transactions, generating a fraud score using the query result, and presenting the fraud score and the cluster ID.

In general, in one aspect, one or more embodiments relate to a method including sending an untransformed transaction to an application. The application is configured to perform generating a vector from unstructured data included in the untransformed transaction, and assigning, for the vector, a cluster ID by matching the vector with a matching cluster vector. The application is further configured to perform generating a query using the cluster ID and the untransformed transaction, and transforming, using the cluster IDs, untransformed transactions to transformed transactions. The transformed transactions each include a cluster ID. The application is further configured to perform generating, using the query, a query result from features of the transformed transactions, generating a fraud score using the query result, and transmitting the fraud score. The method further includes receiving, from the application, the fraud score.

Other aspects of the invention will be apparent from the following description and the appended claims.

DETAILED DESCRIPTION

Figure 1A:
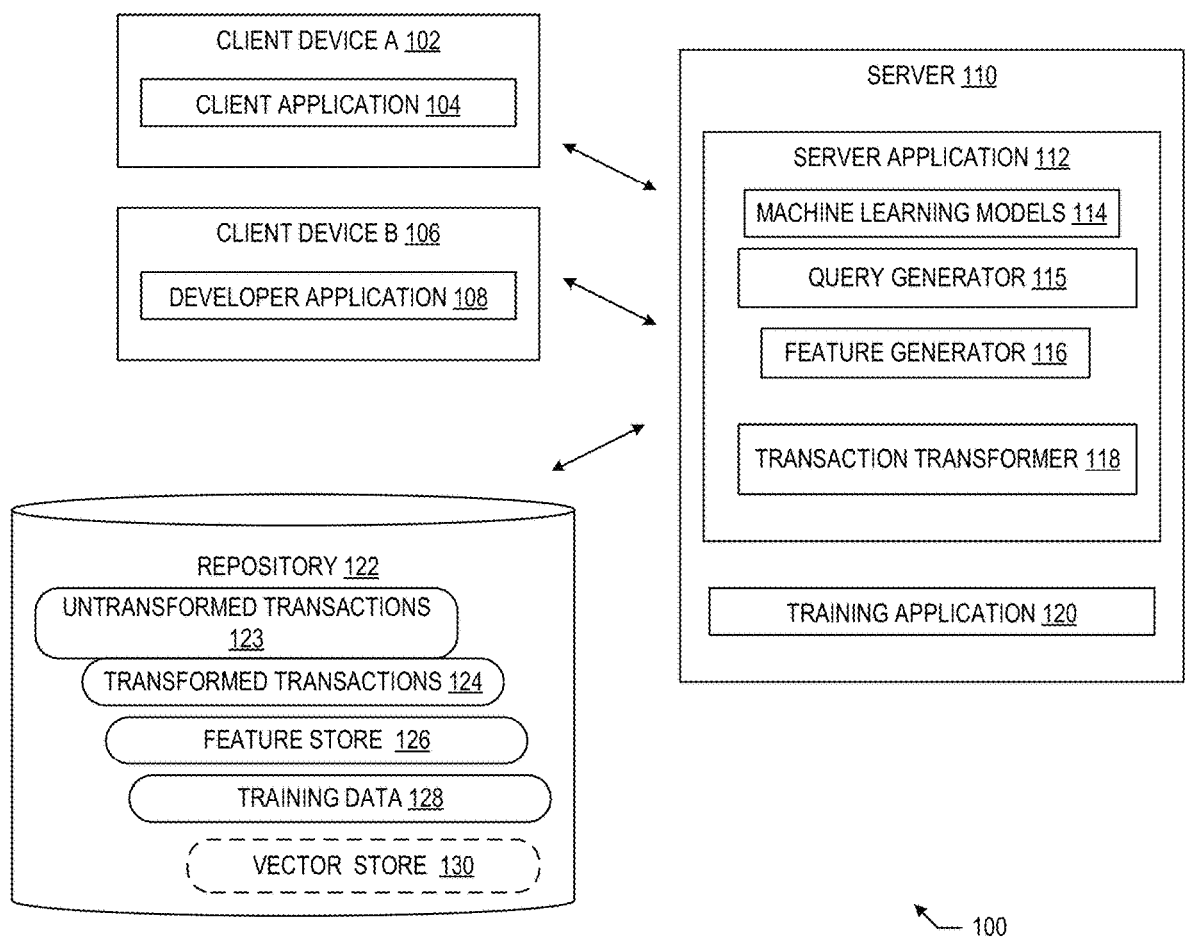
FIG. 1A, FIG. 1B, FIG. 1C, FIG. 1D, and FIG. 1E show a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to assessing fraud risk using unstructured data. Untransformed transactions include unstructured data and/or structured data. Unstructured data may include text represented in natural language (e.g., without a predefined format). In order to facilitate systematic processing of unstructured data, untransformed transactions are converted to transformed transactions by replacing unstructured data with corresponding cluster IDs that represent the intent of the unstructured data. Features of transformed transactions may then be derived by executing queries that access cluster IDs of transformed transactions.

An embedding model is applied to the unstructured data of an untransformed transaction to generate a vector. A cluster ID is assigned to the vector by matching the vector with a cluster of vectors. The cluster ID may identify a cluster of vectors that are within a threshold distance of a centroid. For example, a cluster ID corresponding to "invoice memo" unstructured data may correspond to "utilities," indicating that the untransformed transaction including the invoice memo corresponds to a utilities expense.

A query is generated using the untransformed transaction and the cluster ID. A query result is generated, using the query, from features of transformed transactions. For example, the query result may be the number of transformed transactions satisfying the expression(s) included in the query. Continuing this example, an expression in the query may specify a cluster ID to be used as a search criterion to be matched against features of the transformed transactions. Still continuing this example, a feature may be "transactions received in the past month whose cluster ID=ID78912 and correspond to user account number 56789," where the number of transformed transactions satisfying the query is returned as a query result. A fraud determination model then generates a fraud score for the untransformed transaction using the query result. For example, the fraud determination model may generate a low fraud score for the untransformed transaction when the query result is a large number (e.g., indicating that untransformed transactions relating to utilities are common, and thus unlikely to be fraudulent).

By decoupling the embedding model from the operation of other models (e.g., the fraud determination model), the other models may be unaffected when the embedding model is updated, thus accelerating the overall development lifecycle while maintaining the same level of runtime performance.

FIG. 1 shows a diagram of a system (100). The system (100) includes the client device A (102), the client device B (106), the server (110), and the repository (122). While depicted using a client server architecture, embodiments of the system (100) may be implemented on a single computing system. The client devices A (102) and B (106) are computing systems (further described in FIG. 5A). For example, the client devices A (102) and B (106) may be desktop computers, mobile devices, laptop computers, tablet computers, etc. The client devices A (102) and B (108) respectively include the client application (105) and the developer application (110).

The client application (104) and the developer application (108) are programs running on the client devices A (102) and B (106). The client application (104) is operated by a user to access the server application (112) to access online services (e.g., a fraud determination service) that may be hosted by the server (110). The developer application (108) is used by a developer to operate the training application (120) to train the machine learning models (114) of the system (100). The client application (104) and the developer application (108) may be native applications or may be browser applications that send and receive messages to and from the applications hosted by the server (110).

Figure 5A:
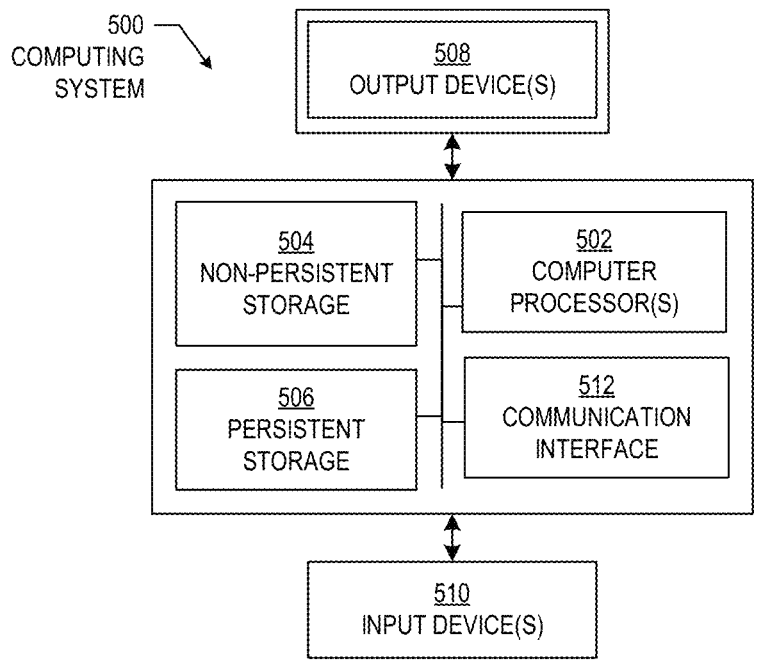
FIG. 5A and FIG. 5B show computing systems in accordance with one or more embodiments of the invention.

The server (110) is a computing system (further described in FIG. 5A). The server (110) may include multiple physical and virtual computing systems that form part of a cloud computing environment. In one embodiment, execution of the programs and applications of server (110) is distributed to multiple physical and virtual computing systems in the cloud computing environment. In one embodiment, the server (110) includes the server application (112) and the training application (120).

The server application (112) is a collection of programs that may execute on the server (110). In one embodiment, the server application (112) hosts a website accessed by the client application (104). The server application (112) includes the machine learning models (114) and the query generator (115).

The machine learning models (114) are programs running as part of the server application (112). The machine learning models (114) include the embedding models (148, 149), cluster models (160, 161), and the fraud determination model (172) of FIG. 1B.

The repository (122) is a computing system that may include multiple computing devices in accordance with the computing system (500) and the nodes (522) and (524) described below in FIGS. 5A and 5B. The repository (122) may be hosted by a cloud services provider that also hosts the server (110). The cloud services provider may provide hosting, virtualization, and data storage services as well as other cloud services and to operate and control the data, programs, and applications that store and retrieve data from the repository (122). The data in the repository (122) includes untransformed transactions (123), transformed transactions (124), a feature store (126), training data (128), and, optionally, a vector store (130).

Untransformed transactions (123) are records of events involving two or more entities. For example, the entities may be a merchant and a customer. Untransformed transactions may be unprocessed transactions (e.g., transactions retrieved from a transaction source). The merchant may be a vendor or other entity that provides a product and/or service to the customer in exchange for receiving an amount (e.g., a dollar amount) on a date. Each untransformed transaction may be an untransformed transaction (140) of FIG. 1B. Untransformed transactions (123) may be converted to transformed transactions (124) by replacing unstructured data included in the untransformed transactions (123) with cluster IDs (see description of FIG. 1B below). The feature store (126) includes features derived from transformed transactions (124), as described in FIG. 1C below. The training data (128) includes data used to train the machine learning models (114) of the system (100). The training data may include training inputs and labels. The vector store (130) includes vectors generated from untransformed transactions (123), as described in FIG. 1D below.

The query generator (115) is a program running as part of the server application (112). The query generator (115) includes functionality to generate a query from an untransformed transaction (123), as described in FIG. 1C below. The feature generator (116) is a program running as part of the server application (112). The feature generator (116) includes functionality to derive features from transformed transactions (124), as described in FIG. 1C below. The transaction transformer (118) is a program running as part of the server application (112). The transaction transformer (118) includes functionality to transform untransformed transactions (123) to transformed transactions (124), as described in FIG. 1B below. The training application (120) is a collection of programs that may execute on the server (110). The training application (120) trains the machine learning models (114) used by the system (100) and may be controlled by the developer application (108).

Figure 1B:
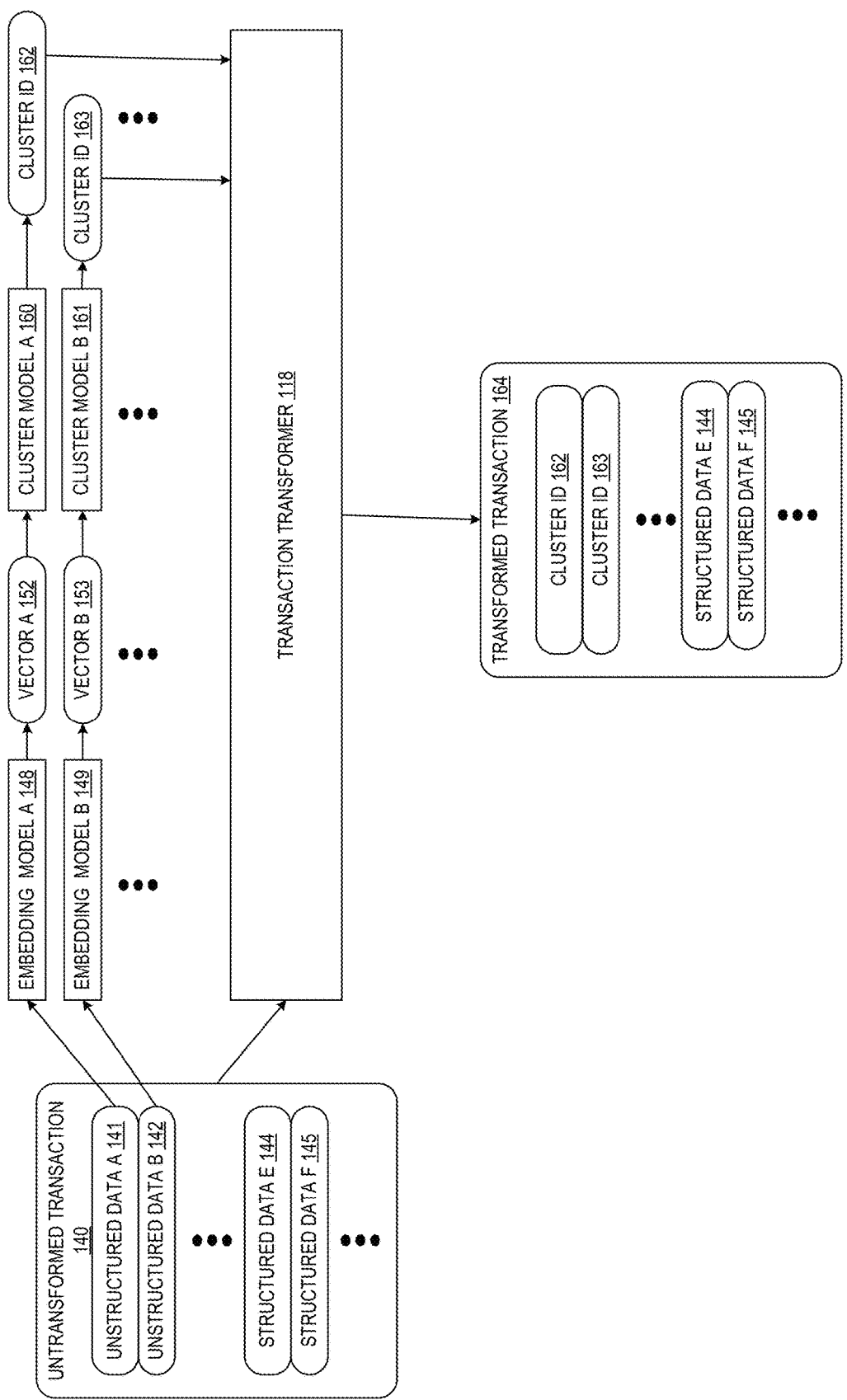

Turning to FIG. 1B, an untransformed transaction (140) includes unstructured data (141, 142) and/or structured data (144, 145). Unstructured data may include text represented in natural language (e.g., without a predefined format). An example of unstructured data may be a "notes" field or a "memo" field. As another example, unstructured data may include actions performed by a user during a browser session. Still another example of unstructured data may be a "digital footprint" for a customer that includes a name, street address, and email address. In contrast, structured data may include clearly defined and formatted data types, such as credit card numbers or IP addresses. Structured data may be easily searched (e.g., via a query language, such as the Structured Query Language (SQL)).

FIG. 1B shows a data flow in which the server application applies embedding models (e.g., embedding models (148, 149)) to unstructured data (141, 142) of an untransformed transaction (140) to generate vectors (152, 153). The embedding models (148, 149) may be natural language processing models that generate the vectors (152, 153) from the unstructured data (141, 142). The unstructured data (141, 142) may correspond to different embedding models (148, 149). For example, unstructured data (141) may correspond to embedding model (148) and unstructured data (142) may correspond to embedding model (149). In one embodiment, the embedding models (148, 149) are n-gram models that identify the n-grams in the different unstructured data (141, 142). N-grams are combinations of characters in a string. For example, the string "dutch" includes the trigrams (an n-gram with three characters) "dut", "utc", and "tch" and includes the 4-grams "dutc" and "utch". The vectors (152, 153) may be sparse vectors that identify the n-grams in the corresponding unstructured data (141, 142).

In one or more embodiments, multiple embedding models may correspond to the unstructured data (e.g., unstructured data (141)), where each embedding model generates a vector from the untransformed transaction (140). For example, the multiple embedding models may be topic models, frequency-based models, adjacency-based models, etc. The vectors generated by the multiple embedding models may be consolidated into a single vector to be input to a cluster model.

The embedding models (148, 149) may use different embedding techniques to convert unstructured data (141, 142) to vectors (152, 153). Examples of such embedding techniques may include:

1) co-occurrence: measuring the correlation and dependence of a sequence of unstructured data. For example, the correlation may measure the co-appearance of tokens (e.g., words or phrases) in a sequence of unstructured "invoice memo" data created by the same customer. As another example, the correlations may occur between a series of tokens representing actions (e.g., a series of web application page views or keyboard actions) performed by a user in a single browser session. As still another example, the correlations may occur between a series of tokens representing a digital footprint of a user.
2) pairwise: generating pairs of sample unstructured data as training data for the embedding models (148, 149);
3) negative sampling: using information from sample cases (e.g., known fraud cases) as negative samples in unstructured data used as training data for the embedding models (148, 149); and
4) DeepWalk and graph techniques: for non-sequential (e.g., categorical) data, first order and second order relationships may be generated using a DeepWalk schema. Latent representations may also be generated using graph techniques (e.g., after a graph has been generated using a DeepWalk schema).

The cluster models (160, 161) include functionality to assign cluster IDs (IDs) (162, 163) to vectors (152, 153). The cluster models (160, 161) may correspond to different unstructured data (141, 142). For example, cluster model (160) may correspond to unstructured data (141) and cluster model (161) may correspond to unstructured data (142). A cluster ID (162) identifies a cluster of vectors that are within a threshold distance of a centroid (e.g., center point) of the cluster of vectors. For example, the distance may be based on a cosine similarity or Euclidean distance between vectors. Continuing this example, the centroid may be a point (e.g., a vector) that represents an average of the vectors in the cluster. The cluster models (160, 161) may group vectors (152, 153) into clusters using various techniques, such as k-means clustering and Density-Based Spatial Clustering of Applications with Noise (DBSCAN).

The cluster ID may be a unique ID (e.g., an integer or alphanumeric string). Each cluster ID may correspond to an intent (e.g., a pattern, or a purpose) of unstructured data corresponding to the vectors in the cluster identified by the cluster ID (162). For example, a cluster ID corresponding to invoice memo unstructured data may correspond to "landscaping," indicating that the invoice including the invoice memo is for a landscaping expense. As another example, a cluster ID for invoice memo unstructured data may correspond to "information technology consulting," indicating that the invoice including the invoice memo is for an information technology consulting expense.

The transaction transformer (118) includes functionality to generate a transformed transaction (164) from the untransformed transaction (140). The transaction transformer (118) may replace the unstructured data (141, 142) of the untransformed transaction (140) with cluster IDs (162, 163).

Figure 1C:
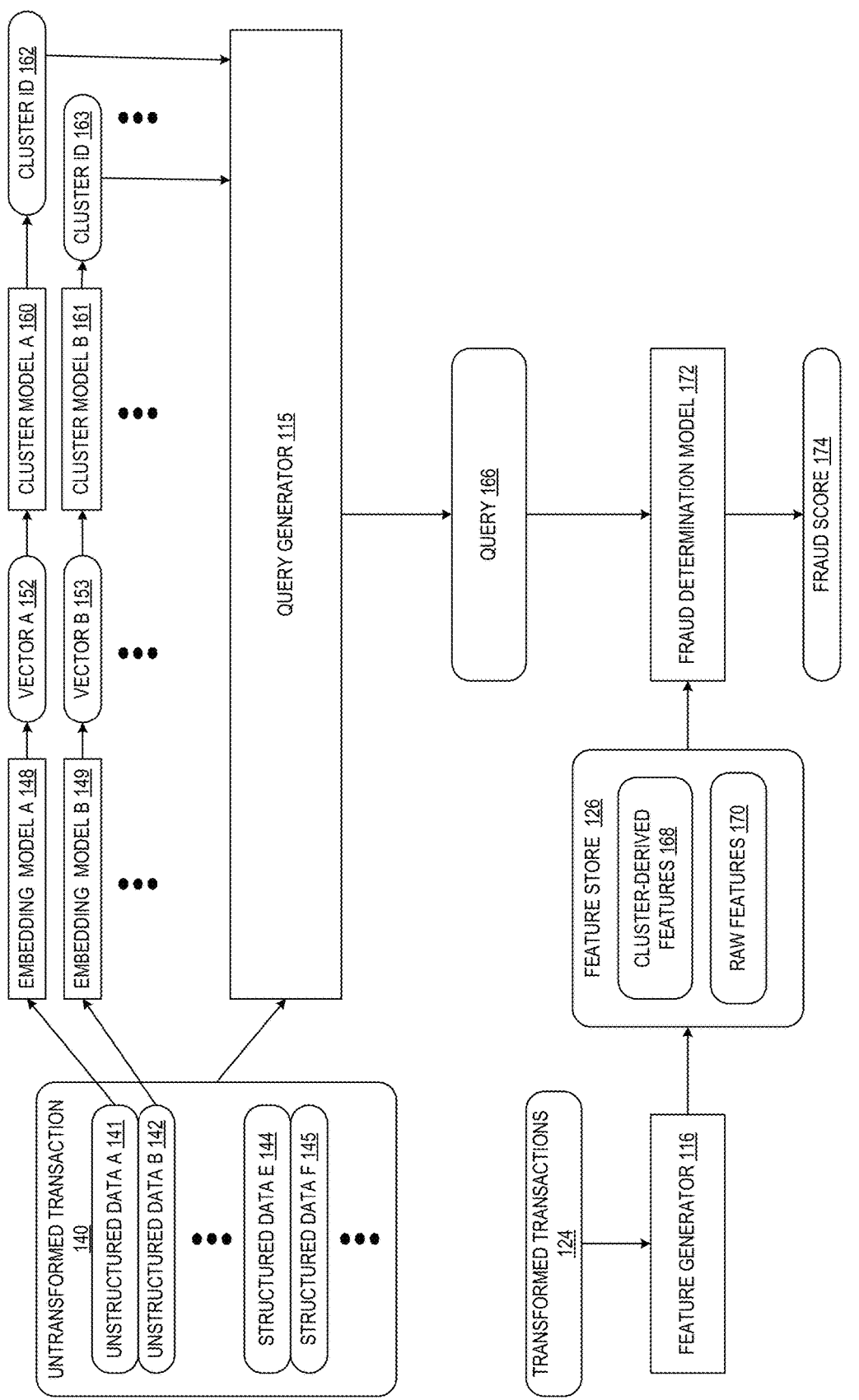

Turning to FIG. 1C, the query generator (115) includes functionality to generate a query (166) from an untransformed transaction (140) and/or cluster IDs (162, 163), as described in Step 256 of FIG. 2 below. The query (166) may include expressions that access the untransformed transaction (140) and/or cluster IDs (162, 163). An expression may include one or more operators, such as Boolean operators, aggregation operators, arithmetic operators, etc. Examples of aggregation operators may include: average, sum, count, maximum, etc. For example, an expression may calculate the total number of transactions over the past 60 days whose unstructured data (e.g., invoice memo) matches the cluster ID assigned to the untransformed transaction.

The query generator (115) may include functionality to generate the query (166) using one or more configuration parameters. For example, the one or more configuration parameters may be specific to (e.g., set by) the fraud determination model (172). Continuing this example, a configuration parameter may set a time interval (e.g., 60 days in the example above) used in the query (166).

The feature generator (116) includes functionality to derive features from transformed transactions (124). The feature generator (116) includes functionality to store the derived features in the feature store (126). Features may be derived by executing one or more queries that access the transformed transactions (124). For example, the queries may access the cluster IDs of the transformed transactions (124). The features may be derived from multiple entities in the transformed transactions (124). For example, the multiple entities may include: a merchant, a customer, a bank account, and/or a payment.

Features that are derived using queries that access one or more cluster IDs of the transformed transactions are referred to as cluster-derived features (168). In contrast, features that are derived using queries that exclude any cluster IDs are referred to as raw features (170). For example, the raw features (170) may be derived using queries that access the structured data of the transformed transactions without referring to any cluster IDs.

The fraud determination model (172) includes functionality to generate, using the query (166), a fraud score (174) from features of transformed transactions (124) (e.g., cluster-derived features (168) and raw features (170) included in the feature store (126)). For example, the result of executing the query (166) may be a numerical value generated using an aggregation operator.

The fraud determination model (172) may be trained using untransformed transactions and different combinations of features (e.g., cluster-derived features and/or raw features) derived from the training transactions. Each training transaction may be labeled as "fraudulent" or "valid." By decoupling the embedding models (148, 149) from fraud determination model (172) training and operation, the overall development lifecycle may be accelerated while maintaining the same level of runtime performance. The fraud score (174) indicates a probability that the untransformed transaction (140) is fraudulent.

Figure 1D:
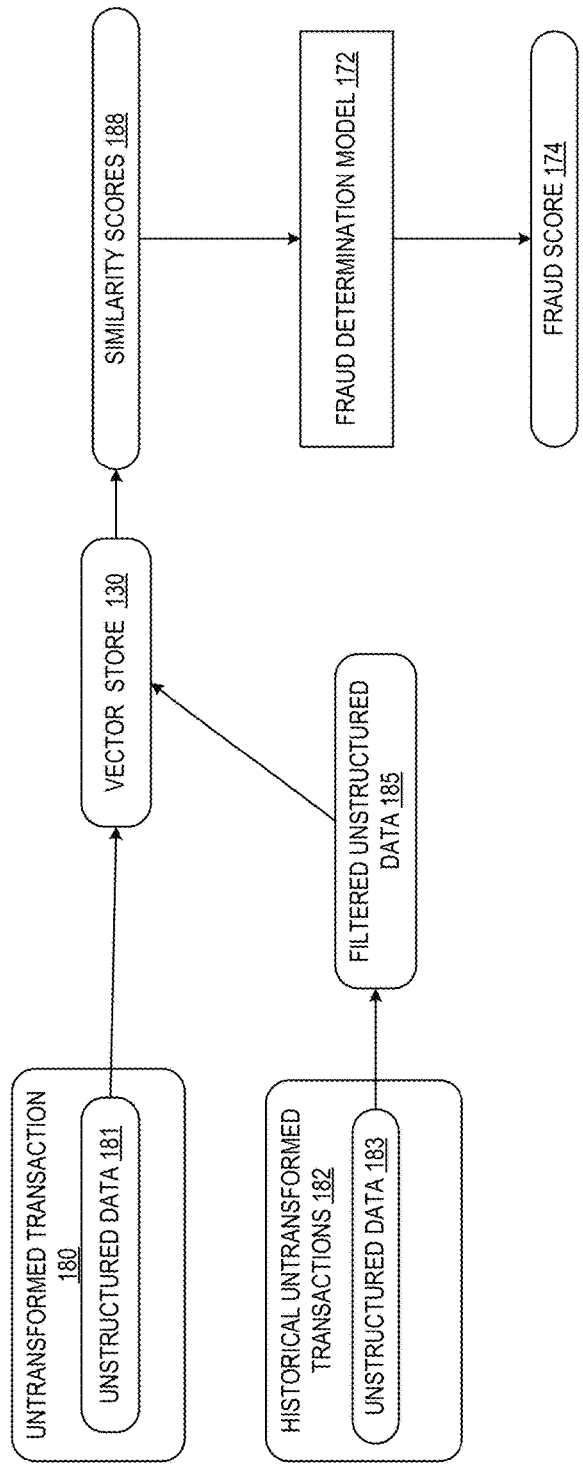
Figure 4A:
FIG. 4A and FIG. 4B show examples in accordance with one or more embodiments of the invention.
Figure 4B:
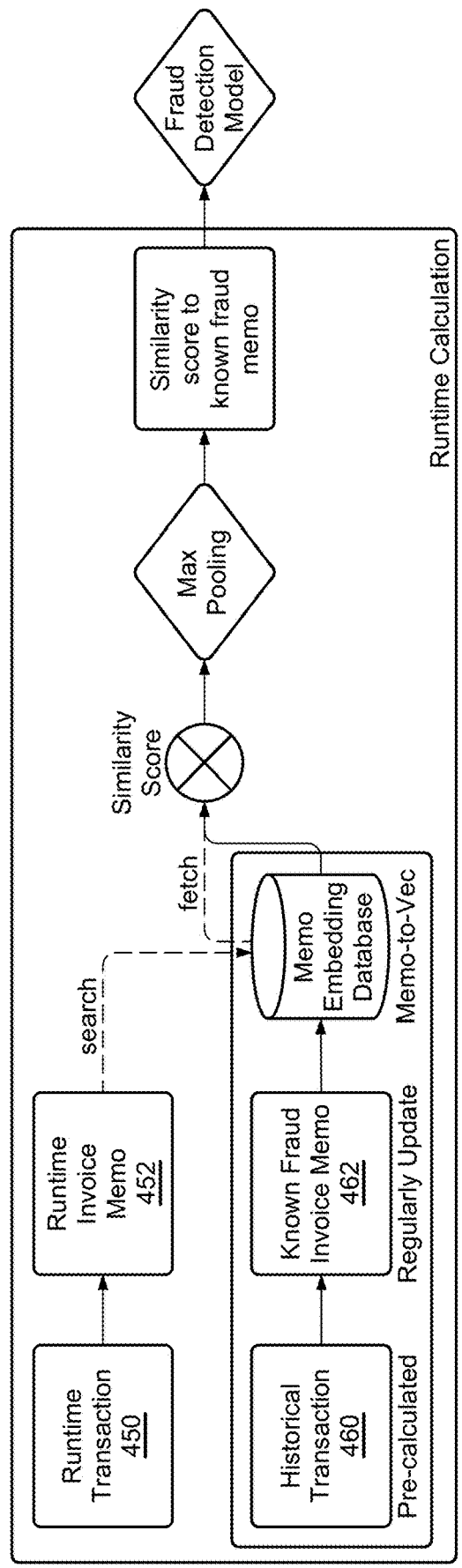

FIG. 1D shows an alternate data flow in which the server application stores, in the vector store (130), a vector generated by applying an embedding model to unstructured data (181) of an untransformed transaction (180). The server application includes functionality to generate filtered unstructured data (185) from unstructured data (183) of historical untransformed transactions (182). The filtered unstructured data (185) may include unstructured data that satisfies a filter criterion. For example, the filter criterion may be inclusion in known fraudulent invoice memo unstructured data. The server application further stores, in the vector store (130), vectors generated by applying the embedding model to the filtered unstructured data (185). The server application includes functionality to calculate similarity scores (188) that represents the similarity (e.g., the cosine similarity) between the vector generated from the unstructured data (181) of the untransformed transaction (180) and the vectors generated from the filtered unstructured data (185) of the historical untransformed transactions (182). The fraud determination model (172) may then use the similarity scores (188) as an input when calculating the fraud score (174). FIG. 4B shows an implementation example corresponding to FIG. 1D.

Figure 1E:
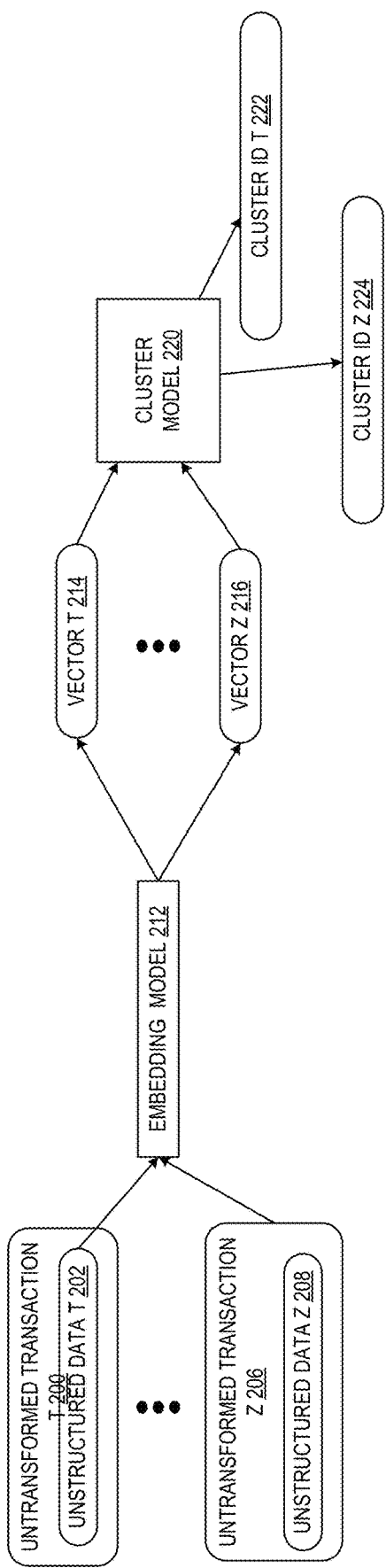

FIG. 1E shows the training of a cluster model (220). An embedding model (212) includes functionality to generate vectors (214, 216) from unstructured data (202, 208) of untransformed transactions (200, 206) in training data. The cluster model (220) then assigns cluster IDs (222, 224) to the vectors (214, 216), for example, using a k-means clustering algorithm. The number of untransformed transactions (200, 202) may exceed the number of cluster IDs (218, 219) by orders of magnitude. For example, a maximum number of clusters may be set to a number less than 100 and the training data may include thousands or millions of transactions. Training the cluster model (220) may be decoupled from the training of the fraud determination model (172). Thus, modifying (e.g., updating) the cluster model (220) may not affect the operation and/or output of the fraud determination model (172).

Figure 2:
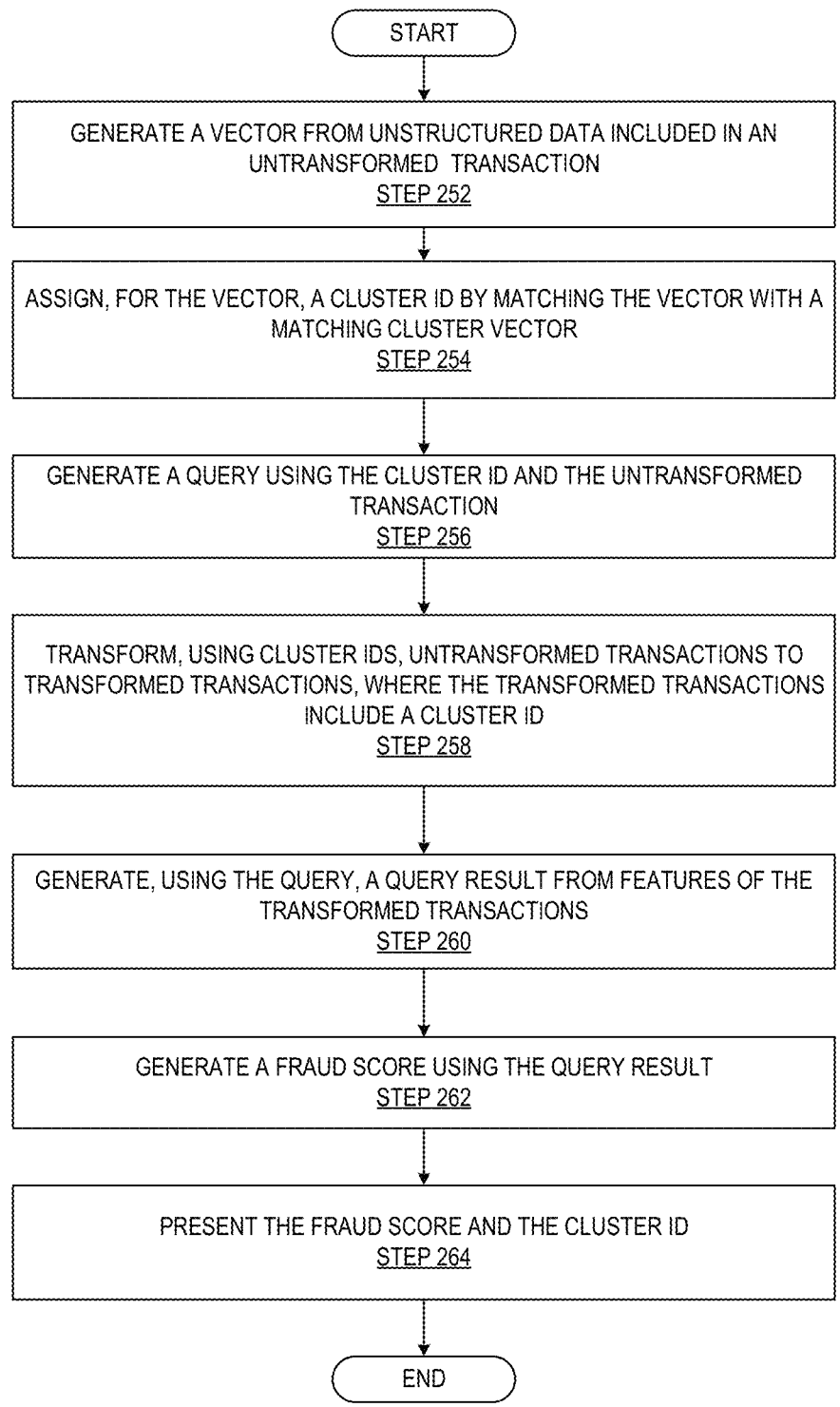
FIG. 2 and FIG. 3 show flowcharts in accordance with one or more embodiments of the invention.

FIG. 2 shows a flowchart in accordance with one or more embodiments of the invention. The flowchart depicts a process for assessing fraud risk using unstructured data. One or more of the steps in FIG. 2 may be performed by the components (e.g., the machine learning models (114), query generator (115) feature generator (116), and transaction transformer (118) of the server application (112)), discussed above in reference to FIGS. 1A, 1B, 1C, 1D, and 1E. In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

Initially, in Step 252, a vector is generated from unstructured data included in an untransformed transaction. The server application may obtain the untransformed transaction from a user (e.g., via a client device). For example, the unstructured data may be a text field represented in natural language, or a tokenized sequence of events, such as web application page views or keyboard actions during a browser session of a user. The vector may be generated by applying one or more embedding models to the unstructured data of the untransformed transaction.

In Step 254, a cluster ID is assigned for the vector by matching the vector with a matching cluster vector. The matching cluster vector is one of a collection of cluster vectors each corresponding to a cluster ID. The server application may determine the matching cluster vector using distances calculated between the vector generated in Step 252 and each cluster vector in the collection of cluster vectors. For example, the server application may determine the matching cluster vector to be the cluster vector with the smallest cosine similarity to the vector generated in Step 252.

In Step 256, a query is generated using the cluster ID and the untransformed transaction. The query generator may generate the query using structured data of the untransformed transaction and/or the cluster ID. For example, the untransformed transaction may be an invoice, the unstructured data may be "invoice memo", and the query may include an expression "invoice memo cluster ID=ID75," where ID75 is a cluster ID corresponding to an "outdoor/yard services" cluster. For example, the query may count the number of transactions whose invoice memos are similar to the invoice memo of the untransformed transaction. The query may further include one or more expressions that access structured data. For example, the query may include an expression "bank account number=34789". The query may include one or more aggregation operators (e.g., "average," "maximum," "sum," "count," etc.) that aggregate the results of one or more expressions included in the query. For example, the query may count the number of valid payments corresponding to invoices whose invoice memo cluster ID=ID75, where the payments also correspond to a specific merchant account number, a specific customer account number, and/or a specific bank account number.

In Step 258, untransformed transactions are transformed, using the cluster IDs, to transformed transactions. The transaction transformer may transform the untransformed transactions to the transformed transactions by:
 1) generating vectors from the unstructured data of the untransformed transactions (see description of Step 252 above);
 2) determining, for the vectors generated in 1) above, matching cluster IDs by matching the respective vector with a matching cluster vector in the collection of cluster vectors (see description of Step 254 above); and
 3) replacing the unstructured data of the untransformed transactions with the matching cluster IDs determined in 2) above.

In Step 260, a query result is generated, using the query, from features of the transformed transactions. For example, an expression in the query may specify a cluster ID to be used as a search criterion to be matched against the features (e.g., the cluster-derived features) of the transformed transactions. Still continuing this example, one such feature may be "transactions received in the past month whose cluster ID=ID78912 and correspond to user account number 56789," where the number of transformed transactions satisfying the query is returned as the query result.

In Step 262, a fraud score is generated using the query result. A fraud model may generate the fraud score using the query result as an input.

In Step 264, the fraud score and the cluster ID are presented. For example, the fraud model may determine that the untransformed transaction is fraudulent when the fraud score exceeds a threshold score. In addition, the server application may present (e.g., to the user) a message indicating that the untransformed transaction is fraudulent, where the message includes the fraud score and the cluster ID. The message may further include a human-understandable category corresponding to the cluster ID (e.g., a specific cluster ID may correspond to the category "landscaping").

As an alternate embodiment, the server application may compare the vector generated in Step 252 above with vectors generated from a subset of historical untransformed transactions satisfying a filter criterion, in order to determine the similarity between the untransformed transaction and the subset of historical untransformed transactions. For example, the filter criterion may be that the historical untransformed transactions include known fraudulent unstructured data (e.g., in an invoice memo field). The vectors may be generated by applying embedding models (see description of Step 252 above) to the known fraudulent unstructured data. Then, the server application may generate similarity scores between the vector generated in Step 252 above and the vectors generated from the known fraudulent unstructured data. The fraud model may then generate the fraud score using the similarity scores. For example, if the average of the similarity scores exceeds a threshold similarity score, then the fraud model may determine that the untransformed transaction is fraudulent.

Figure 3:
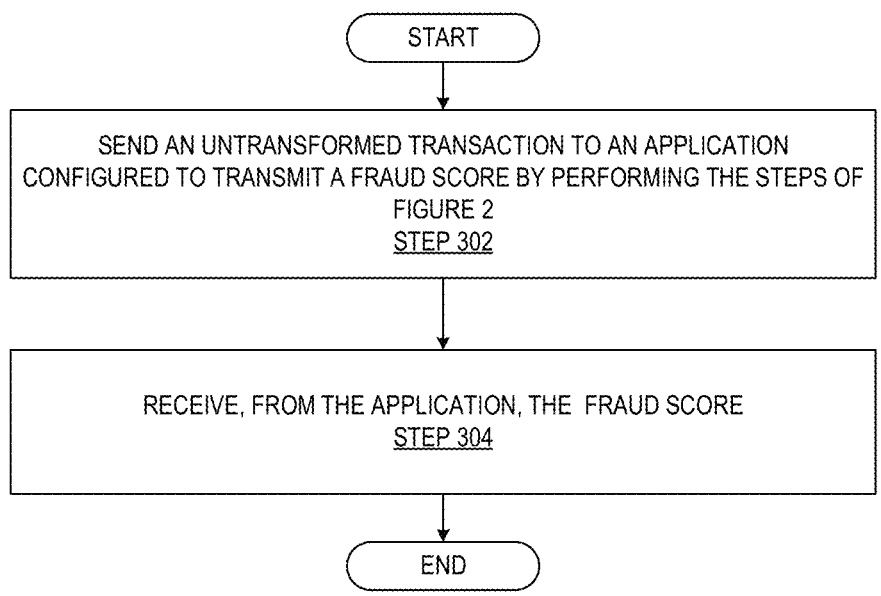

FIG. 3 shows a flowchart in accordance with one or more embodiments of the invention. The flowchart depicts a process for assessing fraud risk using unstructured data. One or more of the steps in FIG. 3 may be performed by the components (e.g., the client application (104) of client device (102), the machine learning models (114), query generator (115) feature generator (116), and transaction transformer (118) of the server application (112)), discussed above in reference to FIGS. 1A, 1B, 1C, 1D, and 1E. In one or more embodiments of the invention, one or more of the steps shown in FIG. 3 may be omitted, repeated, and/or performed in parallel, or in a different order than the order shown in FIG. 3. Accordingly, the scope of the invention should not be considered limited to the specific arrangement of steps shown in FIG. 3.

Initially, in Step 302, an untransformed transaction is sent to an application configured to transmit a fraud score by performing the steps of FIG. 2. The client application may send the untransformed transaction to the application via a network.

In Step 304, the fraud score is received from the application. The client application may receive the fraud score from the application via the network.

The following example is for explanatory purposes only and not intended to limit the scope of the invention. FIG. 4A and FIG. 4B show implementation examples in accordance with one or more embodiments of the invention. FIG. 4A shows an untransformed transaction (400) ((123) in FIG. 1A, (140) in FIGS. 1B and 1C, (180, 182) in FIG. 1D, and (200, 206) in FIG. 1E) received by the server application. The untransformed transaction (400) includes unstructured data (402) ((141, 142) in FIGS. 1B and 1C, (181, 183) in FIG. 1D, and (202, 208) in FIG. 1E). The untransformed transaction (400) is an invoice and the unstructured data (402) is the value of an invoice memo field. The server application converts the unstructured data (402) to a vector using an embedding model, and then determines a cluster ID "42" (406) ((162, 163) in FIGS. 1B and 1C and (222, 224) in FIG. 1E) for the vector using a cluster model. The cluster ID "42" (406) indicates that the unstructured data (402) in the invoice memo field corresponds to "utilities." The server application then transforms the untransformed transaction (400) to a transformed transaction (404) ((124) in FIGS. 1A and 1C and (164) in FIG. 1B) that replaces the unstructured data (402) with the cluster ID (406).

The server application next generates a query (410) ((166) in FIG. 1C) using the cluster ID "42" (406). In this case, the query (410) includes a query expression (412) generated using the cluster ID "42" (406). The result of evaluating the query on features (e.g., cluster-derived features) generated from a collection of transformed transactions is the sum of the amounts of valid payments within the past 90 days corresponding to invoices whose invoice memo field matches cluster ID "42" (406) where the invoices also include a specific merchant account number. In this case, the number of invoices related to "utilities" is large, and thus the query result that aggregates the invoice amounts is a large number. A fraud determination model then uses the query result, in addition to other inputs, to generate a fraud score for the untransformed transaction (400). In this case, because of the large query result, the fraud determination model generates a low fraud score for the untransformed transaction (400).

In an alternate scenario, if the cluster ID (e.g., a cluster ID corresponding to "consulting services") had corresponded to a small number of invoices, or zero invoices, the query result that aggregates the invoice amounts is a small number, or zero. In the alternate scenario, the fraud determination model generates a high fraud score for the untransformed transaction (400).

FIG. 4B shows an alternate data flow that includes an untransformed transaction (450) ((180) in FIG. 1D) that includes an invoice memo (452) ((181) in FIG. 1D) and historical untransformed transactions (460) ((182) in FIG. 1D). FIG. 4B further shows known fraud invoice memos (462) ((185) in FIG. 1D) that have been filtered from the historical untransformed transactions (460). That is, the known fraud invoice memos (462) are unstructured data satisfying a filter criterion, namely the filter criterion of being known fraudulent invoice memos. The server application stores, in the vector store (465) ((130) in FIGS. 1A and 1D): 1) a vector generated by applying an embedding model to the invoice memo (452) of the untransformed transaction (450), and 2) vectors generated by applying the embedding model to the known fraud invoice memos (462) of the historical untransformed transactions (460). The server application calculates similarity scores (470) ((188) in FIG. 1D) that represents the cosine similarity between the vector generated from the invoice memo (452) of the untransformed transaction (450) and the vectors generated from the known fraud invoice memos (462) of the historical untransformed transactions (460). The fraud determination model (472) ((172) in FIG. 1D) then uses the similarity scores (470) as an input when calculating a fraud score.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Figure 5B:
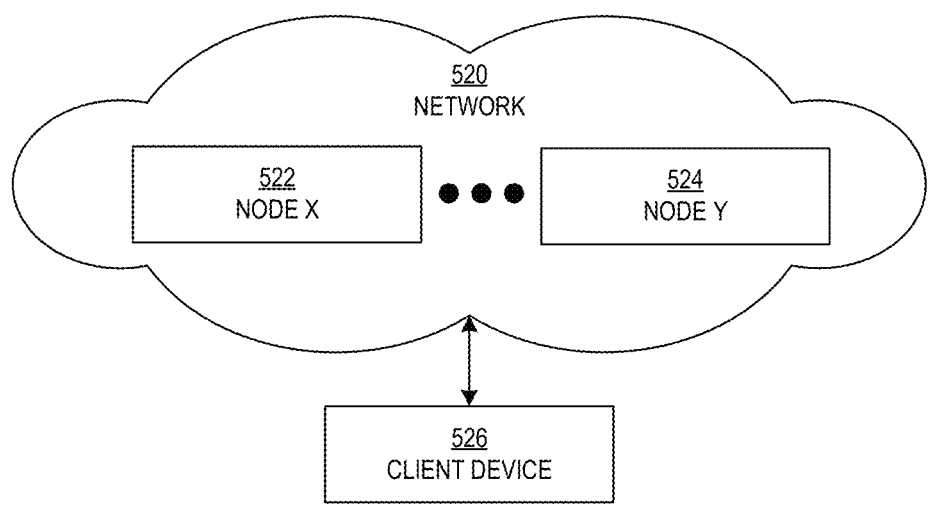

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 5A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an ID string or may be a query presented to a structured data repository (where the data repository may be organized according to a database schema or data format, such as extensible Markup Language (XML)).

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), ID(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting fraud in a transaction record, comprising:
   receiving, from a software application, by an online fraud determination service, the transaction record, wherein the record comprises an untransformed transaction including a first unstructured data, wherein the online fraud determination service includes an embedding model, a cluster model, a query generator, a transaction transformer, and a fraud determination model;
   generating, by the embedding model corresponding to the first unstructured data, a first vector from the first unstructured data included in the untransformed transaction, wherein the embedding model is trained to generate vectors from the first unstructured data;
   receiving, by the cluster model, from the embedding model, the first vector corresponding to the first unstructured data;
   assigning, by the cluster model, for the first vector, a first cluster ID by matching the first vector with a first matching cluster vector,
      wherein the first cluster ID is based on a cluster of vectors within a threshold distance of a centroid of the cluster of vectors,
      the centroid represents an average of the vectors in that cluster,
      wherein the first cluster ID is one of a first set of cluster ID's in which each cluster ID in the first set is expressed in a fixed format comprising an integer or alphanumeric string, and
      the cluster model is trained to cluster vectors from the first unstructured data;
   generating, by a query generator, a first query using the first cluster ID and the untransformed transaction;
   generating, using the first query, a query result from a plurality of features of prior transactions stored in a feature store, wherein the features are generated from a plurality of prior transformed transactions, wherein each transformed transaction comprises one or more cluster IDs;
   transforming, by a transaction transformer, using a plurality of cluster IDs generated by the cluster model, wherein the transformed transactions are generated from a plurality of untransformed transactions by transforming them to a plurality of transformed transactions, wherein the plurality of transformed transactions each comprise a cluster ID, and
      wherein the plurality of untransformed transactions comprises the untransformed transaction, and
      wherein transforming each of the untransformed transactions comprises replacing the first unstructured data from the untransformed transaction with the first cluster ID, assigned to the first vector generated from the first unstructured data, in a transformed transaction of the plurality of transformed transactions;
   generating, by a feature generator, a plurality of features from the plurality of transformed transactions and storing, by the feature generator, the plurality of features in a database,
      wherein the plurality of features comprise cluster-derived features including cluster ID's expressed in the fixed format;
   applying the fraud determination model to the query result to generate a fraud score for the transformed transaction,
      wherein the fraud determination model has been trained on the cluster-derived features expressed in the fixed format and on other non-cluster derived features,
      wherein the fraud score is based on the query result and indicates a probability that the transformed transaction is fraudulent, and
      wherein the fraud determination model is trained on untransformed transactions and a combination of features derived from training transactions labeled as fraudulent or valid;
   presenting the fraud score and the first cluster ID to a user of the software application; and
   updating the cluster model to add or delete or modify the clusters to generate a second set of cluster ID's, wherein the second set of cluster ID's is expressed in the fixed format, whereby generating the second set of cluster ID's does not affect the input or output of the fraud determination model.

2. The method of claim 1, further comprising:
   deriving, from the plurality of transformed transactions and using a second query, a cluster-derived feature, wherein the second query comprises at least one cluster ID; and
   deriving, from the plurality of transformed transactions and using a third query, a raw feature, wherein the third query excludes the plurality of cluster IDs,
   wherein the plurality of features of the plurality of transformed transactions comprise the cluster-derived feature and the raw feature.

3. The method of claim 1, wherein the plurality of transactions comprise a plurality of unstructured data, and wherein transforming the plurality of untransformed transactions to the plurality of transformed transactions comprises:
   generating a plurality of vectors from the plurality of unstructured data of the plurality of untransformed transactions;
   assigning, for the plurality of vectors, a plurality of matching cluster IDs by matching the respective vectors with respective matching cluster vectors; and
   replacing the plurality of unstructured data of the plurality of untransformed transactions with the plurality of matching cluster IDs.

4. The method of claim 1, further comprising:
   generating a second vector from unstructured data included in another untransformed transaction;
   obtaining a subset of the plurality of untransformed transactions satisfying a filter criterion;

generating a plurality of vectors from a plurality of unstructured data of the subset of the plurality of untransformed transactions;

generating a plurality of similarity scores between the second vector and the plurality of vectors;

generating another fraud score using the plurality of similarity scores; and determining, using the another fraud score, that the another transaction is fraudulent.

5. The method of claim 1, wherein a plurality of embedding models are trained to convert untransformed transactions in training data to vectors corresponding to a plurality of n-grams.

6. A server comprising:

at least one processor, and an online fraud determination service executing on the server and configured for:

receiving, from a software application, a transaction record, wherein the transaction record comprises an untransformed transaction including a first unstructured data, wherein the online fraud determination service includes an embedding model, a cluster model, a query generator, a transaction transformer, and a fraud determination model;

generating, by the embedding model corresponding to the first unstructured data, a first vector from the first unstructured data included in the untransformed transaction, wherein the embedding model is trained to generate vectors from the first unstructured data;

receiving, by the cluster model, from the embedding model, the first vector corresponding to the first unstructured data;

assigning, by the cluster model corresponding to the first unstructured data, for the first vector, a first cluster ID by matching the first vector with a first matching cluster vector, wherein the first cluster ID is based on a cluster of vectors within a threshold distance of a centroid of the cluster of vectors, the centroid represents an average of the vectors in that cluster, wherein the first cluster ID is one of a first set of cluster ID's in which each cluster ID in the first set is expressed in a fixed format comprising an integer or alphanumeric string, and the cluster model is trained to cluster vectors from the first unstructured data generating, by a query generator, a first query using the first cluster ID and the untransformed transaction;

generating, using the first query, a query result from a plurality of features of prior transactions stored in a feature store, wherein the features are generated from a plurality of prior transformed transactions, wherein each transformed transaction comprises one or more cluster IDs;

transforming, by a transaction transformer executing on the at least one computing system, using a plurality of cluster IDs generated by the cluster model, wherein the transformed transactions are generated from a plurality of untransformed transactions by transforming them to a plurality of transformed transactions, wherein the plurality of transformed transactions each comprise a cluster ID, and wherein the plurality of untransformed transactions comprises the untransformed transaction, and wherein transforming each of the untransformed transactions comprises replacing the first unstructured data from the untransformed transaction with the first cluster ID, assigned to the first vector generated from the first unstructured data, in a transformed transaction of the plurality of transformed transactions;

generating, by a feature generator, a plurality of features from the plurality of transformed transactions and storing, by the feature generator, the plurality of features in a database, wherein the plurality of features comprise cluster-derived features including cluster ID's expressed in the fixed format;

applying the fraud determination model to the query result to generate a fraud score for the transformed transaction, wherein the fraud determination model has been trained on the cluster-derived features expressed in the fixed format and on other non-cluster derived features, wherein the fraud score is based on the query result and indicates a probability that the transformed transaction is fraudulent, and wherein the fraud determination model is trained on untransformed transactions and a combination of features derived from training transactions labeled as fraudulent or valid;

presenting the fraud score and the first cluster ID to a user of the software application; and updating the cluster model to add or delete or modify the clusters to generate a second set of cluster ID's, wherein the second set of cluster ID's is expressed in the fixed format, whereby generating the second set of cluster ID's does not affect the input or output of the fraud determination model.

7. The server of claim 6, wherein the online fraud determination service is further configured for:

deriving, from the plurality of transformed transactions and using a second query, a cluster-derived feature, wherein the second query comprises at least one cluster ID, and deriving, from the plurality of transformed transactions and using a third query, a raw feature, wherein the third query excludes the plurality of cluster IDs, wherein the plurality of features of the plurality of transformed transactions comprise the cluster-derived feature and the raw feature.

8. The server of claim 6, wherein the plurality of untransformed transactions comprise a plurality of unstructured data, and wherein transforming the plurality of untransformed transactions to the plurality of transformed transactions comprises:

generating a plurality of vectors from the plurality of unstructured data;

assigning, for the plurality of vectors, a plurality of matching cluster IDs by matching the respective vectors with respective matching cluster vectors; and replacing the plurality of unstructured data of the plurality of untransformed transactions with the plurality of matching cluster IDs.

9. The server of claim 6, wherein the online fraud determination service is further configured for:

generating a second vector from unstructured data included in another untransformed transaction;

obtaining a subset of the plurality of untransformed transactions satisfying a filter criterion;

generating a plurality of vectors from a plurality of unstructured data of the subset of the plurality of untransformed transactions;

generating a plurality of similarity scores between the second vector and the plurality of vectors;

generating another fraud score using the plurality of similarity scores; and determining, using the another fraud score, that the another untransformed transaction is fraudulent.

10. The server of claim 6, wherein the plurality of embedding models are trained to convert untransformed transactions in training data to vectors corresponding to a plurality of n-grams.

11. A method comprising:

sending an untransformed transaction including a first unstructured data to an online fraud determination service including a fraud determination model, an embedding model, a cluster model, a query generator, and a transaction transformer, wherein the online fraud determination service is configured to perform:

generating, by the embedding model, a vector from the first unstructured data included in the untransformed transaction, wherein the embedding model is trained to generate vectors from the first unstructured data;

receiving, by the cluster model, from the embedding model, the first vector corresponding to the first unstructured data;

assigning, by the cluster model, for the vector, a cluster ID by matching the vector with a matching cluster vector, wherein the cluster model is trained to cluster vectors from the first unstructured data;

generating, by the query generator, a first query using the cluster ID and the untransformed transaction, transforming, by the transaction transformer, using a plurality of cluster IDs generated by the cluster model, a plurality of untransformed transactions to a plurality of transformed transactions, wherein the plurality of transformed transactions each comprise a cluster ID, and wherein the plurality of untransformed transactions comprises the untransformed transaction, and wherein transforming each of the untransformed transactions comprises replacing the first unstructured data from the untransformed transaction with the corresponding cluster ID, assigned to the vector generated from the first unstructured data, in a transformed transaction of the plurality of transformed transactions;

generating, using the first query, a query result from a plurality of features of prior transactions stored in a feature store, wherein the features are generated from a plurality of prior transformed transactions, wherein each transformed transaction comprises one or more cluster IDs;

applying the fraud determination model to the query result to generate generating a fraud score using the query result, wherein the fraud determination model has been trained on the cluster-derived features expressed in the fixed format and on other non-cluster derived features and transmitting the fraud score; and receiving, from the online fraud determination service, the fraud score.

12. The method of claim 11, wherein the online fraud determination service is further configured to perform:

deriving, from the plurality of transformed transactions and using a second query, a cluster-derived feature, wherein the second query comprises a cluster ID, and deriving, from the plurality of transformed transactions and using a third query, a raw feature, wherein the third query excludes the plurality of cluster IDs, wherein the plurality of features of the plurality of transformed transactions comprise the cluster-derived feature and the raw feature.

* * * * *